April 4, 1967   J. W. DEAN ETAL   3,312,902
SELF-ERECTING FLOATING STRUCTURE
Filed June 29, 1964                         2 Sheets-Sheet 1

INVENTORS
JOSEPH W. DEAN
KENNETH E. SMITH
BY
*Charles B. Haverstock*
ATTORNEY

April 4, 1967  J. W. DEAN ETAL  3,312,902
SELF-ERECTING FLOATING STRUCTURE
Filed June 29, 1964  2 Sheets-Sheet 2
FIG. 6.
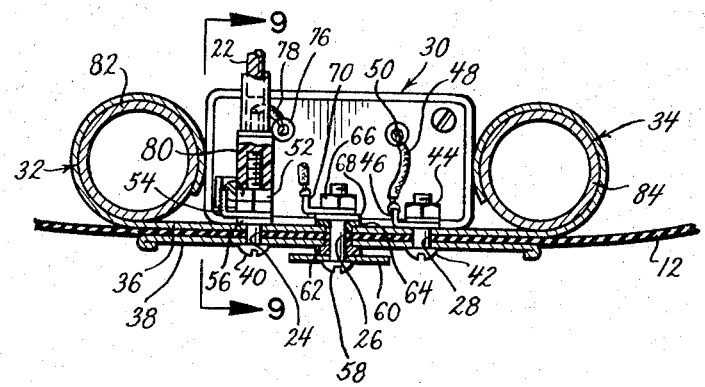
FIG. 7.
FIG. 8.
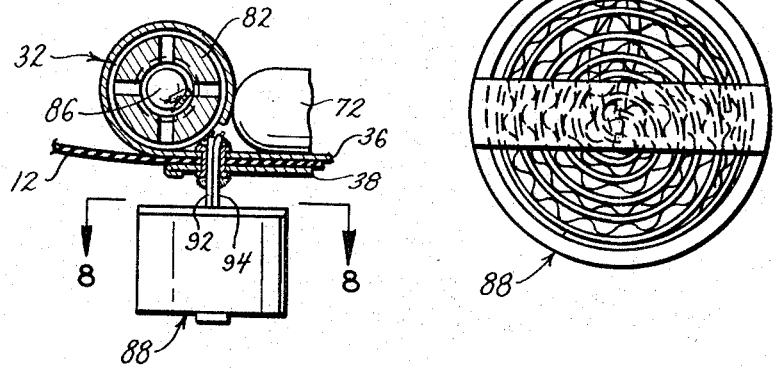
FIG. 9.
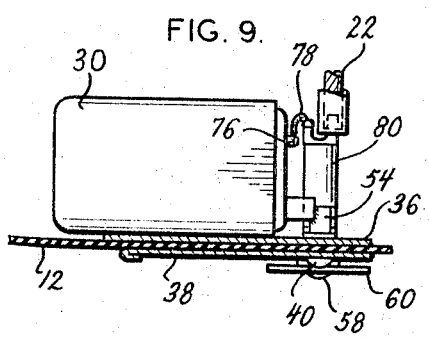
INVENTORS
JOSEPH W. DEAN
KENNETH E. SMITH
BY Charles B. Haverstock
ATTORNEY

United States Patent Office 3,312,902
Patented Apr. 4, 1967

3,312,902
SELF-ERECTING FLOATING STRUCTURE
Joseph W. Dean, Florissant, and Kenneth E. Smith, Hazelwood, Mo., assignors to McDonnell Aircraft Corporation, St. Louis, Mo., a corporation of Maryland
Filed June 29, 1964, Ser. No. 378,500
13 Claims. (Cl. 325—116)

The subject invention relates generally to floating structures and more particularly to a self-inflating floating structure including antenna and transmitting means.

There has, for a long time, been need for a device which is economical to construct, compact and self-operating and functioning to provide signals and other information as to the location of an object that is lost at sea such as an airplane, a boat, a raft, or any of a number of other devices all of which are difficult to locate in the open sea in time to prevent loss of life and property. Many persons have lost their lives because of their inability to send signals to enable rescuers to reach them. Furthermore, in emergency situations such as when an airplane goes down at sea there is usually little or no time to send a warning or prepare a warning device to do so in order to direct people to the spot. Furthermore, the conventional warning or locating means including dye marking means and other means are of relatively brief effectiveness and are not suitable for many situations such as in inclement weather and stormy seas. Many attempts have been made and many devices constructed to solve this problem and to provide an effective warning and signalling device but all of the known devices are either of relatively short life duration, or relatively expensive and therefore not available for or usable in many situations, or are too complicated and cumbersome for many applications. These and other disadvantages and shortcomings of the known devices are overcome by the present device which comprises a relatively lightweight inflatable member or balloon with means located therein for self-inflating in salt water, means for erecting an antenna therein during inflating, and transmitting means including a power supply therefor connected to the antenna and positioned in the inflatable member for keeping the structure upright on the water and for sending out signals to aid in location and rescue operations. The subject device is also entirely self-inflating and self-operating and does not require any positive acts on the part of an operator in order to establish it in an operating condition. Still further, the subject device is constructed to ride high in the water so that its antenna will have maximum effectiveness, and the subject device includes means for towing it if desired and it may even be used by swimmers as a life-preserver.

It is therefore a principal object of the present invention to provide relative inexpensive and lightweight means for sending location and other information in emergency situations.

Another object is to provide a self-erecting structure capable of transmitting signals, which structure requires no positive actions on the part of a person to establish it in operating condition.

Another object is to provide a self-inflating structure with antenna means therein which rides high on the water.

Another object is to provide reliable means for locating objects lost at sea.

Another object is to provide actuating means for a warning device which are controlled by contact with salt water.

Another object is to provide a warning device which can be folded into a relatively compact package and dropped from an airplane or other device, or released on or below the surface of water.

Another object is to provide a device of the type described which has a relatively long life.

These and other objects and advantages of the present invention will become apparent after considering the following detailed specification in conjunction with the accompanying drawings, wherein:

FIG. 6 is an enlarged cross-sectional view taken on line 6—6 of FIG. 3;

FIG. 7 is an enlarged fragmentary sectional view of an inflating cylinder and the power supply therefor;

FIG. 8 is a further enlarged cross-sectional view of a salt water battery employed for energizing the inflating means, said view being taken on line 8—8 of FIG. 7; and FIG. 9 is a fragmentary cross-sectional view taken on line 9—9 of FIG. 6.

Figure 1:
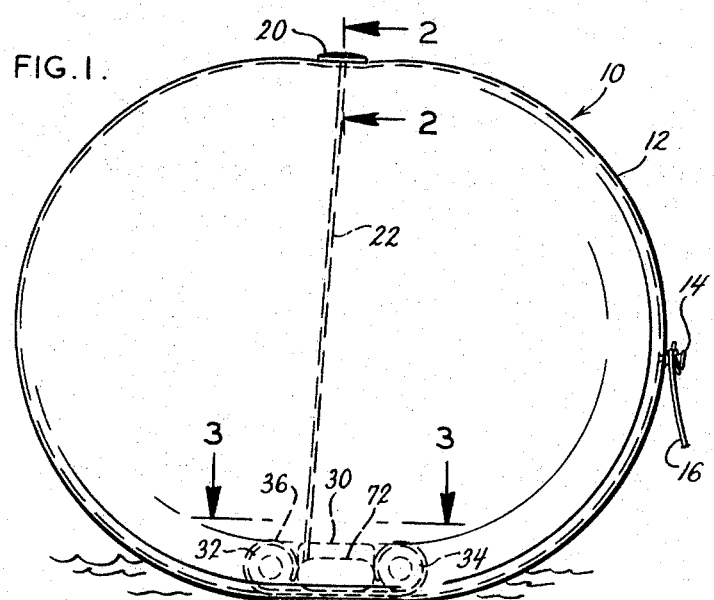
FIG. 1 is a cross-sectional view showing the subject warning device in inflated operative condition.

Referring to the drawings more particularly by reference numbers, the number 10 refers to an inflatable structure constructed according to the present invention. The structure 10 includes a balloon 12 of suitable size and shape which is impervious to water. The balloon 12 has an inlet tube 14 which is preferably located as shown when the balloon is inflated and floating on the water. The inlet tube 14 may also be connected to a cord or tow line 16 for attaching the structure to a boat or other floating object although it is contemplated that the balloon be free floating if desired.

Figure 2:
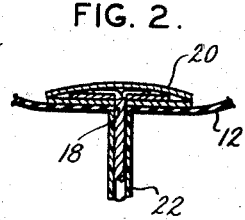
FIG. 2 is an enlarged fragmentary cross-sectional view taken on line 2—2 of FIG. 1.

A hole 18 is formed through the balloon (FIG. 2) and suitable means 20 are attached to the balloon at the hole 18 and are provided for anchoring one end of an antenna structure 22. The antenna 22 is preferably a flexible member such as a flexible metallic cord, and when the balloon is inflated the antenna 22 extends across the inside of the balloon in a vertical direction as shown. The anchoring means 20 are constructed to seal around the hole 18 to prevent loss of gas therethrough, and the antenna 22 is shorter than the natural inflated diameter of the balloon to remain fairly taut in operating condition.

Other holes 24, 26 and 28 are formed through the balloon on the opposite side thereof from the hole 18 and are used for mounting transmitter means 30, inflating means 32 and 34, and other associated components. The transmitter 30 and the inflating means 32 and 34 are mounted on a plate member 36 which has curved end portions for the inflating means 32 and 34 (FIG. 6). The transmitter 30 is mounted between the members 32 and 34. The plate 36 is positioned inside the balloon 12 and is clamped to the balloon by threaded connections with another plate member 38 which is located against the outer surface of the balloon. The plates 36 and 38 can be coated or covered with cloth or other material which seals them to the balloon and which reduces the danger of balloon damage. The edges of the plates 36 and 38 are also preferably rounded or formed to prevent damage to the balloon.

The threaded connections include threaded members 40 and 42 which extend through the holes 24 and 28 respectively. The threaded members 40 and 42 may also serve as terminals for electrical connections. For example, the member 42 has a nut 44 thereon which holds a connector 46 against the plate 36 to form a ground connection for the transmitter. The member 42 also provides an electrical connection between the plates 36 and 38. The connector 46 is also connected by lead 48 to a transmitter terminal 50. The threaded member 40 also has one or more nuts 52 thereon and they support another electrical connector 54 against a washer 56. The connector 54 is connected electrically to the housing of the transmitter 30.

Figure 4:
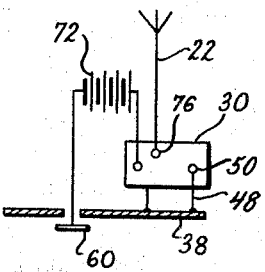
FIG. 4 is a schematic diagram of the circuit for the transmitting means, the antenna and the power supply employed therefor.

Another threaded member 58 extends through the balloon hole 26 and also through a conductor member 60, insulator members 62 and 64, a nut 66, suitable washers 68 and also through the plates 36 and 38. A connector 70 is mounted on the member 58 and makes electrical contact therewith. The conductor member 60 is spaced and insulated from the plates 36 and 38 by the insulator member 62 and forms a salt water switch therewith which controls the energizing of the transmitter 30. The transmitter is energized by the switch when the switch is immersed in salt water due to the action of the water which effectively shorts between the members 60 and 38. This in turn completes a circuit through battery 72, which is preferably a mercury type battery of a conventional construction known for having a relatively long "shelf" or storage life, and through the transmitter. The transmitter circuit is shown schematically in FIG. 4. The transmitter 30 has an input terminal 76 which is connected by lead 78 to a terminal on an adaptor member 80 which is mounted on the threaded member 40. The terminal 76 is also connected to the lower end of the antenna 22. Therefore, as already stated, when the salt water switch is immersed in salt water electrical contact will be established between the members 60 and 38 to energize the transmitter 30 and cause the transmitter 30 to transmit a signal over the antenna 22.

Figure 3:
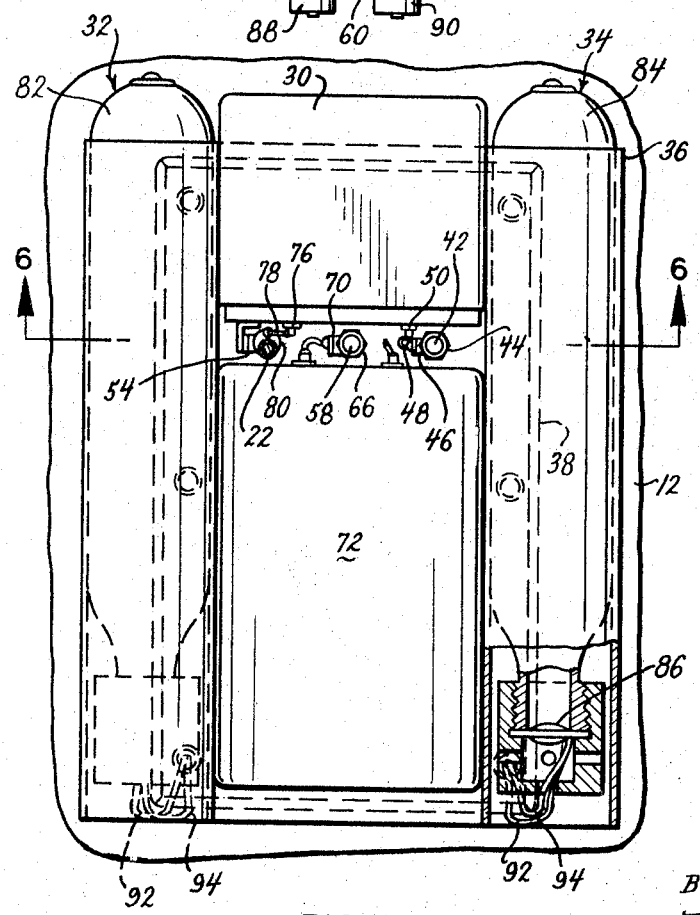
FIG. 3 is an enlarged fragmentary cross-sectional view taken on line 3—3 of FIG. 1.
Figure 5:
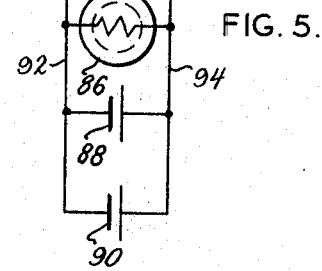
FIG. 5 is a schematic diagram of the control circuit for the inflating means employed on the subject device.

The inflating means for the subject device are shown as being two similar inflating members or compressed gas cartridges 82 and 84 such as carbon dioxide cartridges or the like although only one is required if it has sufficient capacity. The cartridges 82 and 84 are mounted in the curved end portions of the plate 36 as aforesaid and each of the cartridges has a squib 86 which is positioned closing the neck thereof. The squibs 86 are constructed of an explosive or pyrotechnic material which when excited electrically are self-destroying to allow the compressed gas contained therein to escape and inflate the balloon 12. The squibs 86 are connected to a source of electrical energy which is shown as salt water batteries 88 and 90. The batteries 88 and 90 are normally inactive but are capable of producing sufficient electrical energy when immersed in salt water to destroy the squibs 86. The batteries 88 and 90 are connected to the squibs 86 by leads 92 and 94 as shown in FIG. 3. The structural details of the salt water batteries 88 and 90 are shown in FIG. 8. It is also contemplated to provide a separate battery for each squib 86 although in practice it has been found that the parallel connections shown in FIG. 5 are very satisfactory and reliable.

The subject device including all of its components can be folded into a relatively small and compact package and the device can also be constructed and assembled relatively quickly and easily because the balloon inlet can be stretched to be large enough to receive the components which are positioned inside in assembled condition. Therefore, the installation simply requires locating the parts and puncturing the balloon in the necessary places to install the threaded and other connectors. Thereafter, the balloon with the elements inside is evacuated and folded into a compact condition for later use or for storage such as in a suitable compartment on an airplane, space vehicle, ship or other objects or on the person using it. If it is installed on an airplane or space vehicle it is preferable to locate it in a compartment from which it can easily escape when the airplane is down without requiring any operation by the personnel on the airplane. This can include a compartment with a spring biased door which will be forced open when salt water gets into it and causes the balloon to inflate. The door can also be operated by its own salt water battery or other source of energy (not shown), or the door can be water operated. The subject device can also be ejected manually if desired without changing the nature of the invention.

Once an airplane or other device equipped with the subject device is in the water and the salt water gets to the batteries 88 and 90, the batteries will provide energy to destroy the squibs 86 and to open the cartridges 82 and 84 to inflate the balloon 12. At the same time the salt water switch will close electrically to establish the circuit to energize the transmitter 30. It is preferable that the balloon inflate to approximately the shape shown in FIG. 1. It is also preferred to have the cord 16 and the nozzle 14 located on the side of the balloon when inflated because this makes it more convenient for towing. The inflated balloon should also stretch the antenna to keep it upright. It is contemplated to also coat the lower portion of the balloon with a metallic or other electrical conductive coating material to provide a better ground plane. Such a coating may also have reflective properties which may improve the radiation pattern of the device. A coating is not an essential element of the device, however, and if used should be applied so as not to adversely effect or change the stretchability and normal inflated shape of the balloon.

As already pointed out, one of the main advantages of the subject invention is that it provides a relatively inexpensive and compact device for use on airplanes, life rafts and other objects as a means for locating said objects when they are down or lost at sea. The subject device has actually been constructed and successfully tested even under extremely adverse conditions using well known components wherever possible including meteorological balloons, mercury batteries, carbon dioxide compressed gas cylinders, and other relatively available and inexpensive parts. The transmitters are constructed to operate within a frequency range established and reserved for emergency and distress purposes. The transmitter can be constructed and factory adjusted to produce different kinds of outputs as required including output pulses or continuous wave signals. The outputs can also be modulated.

Thus there has been shown and described a novel inflatable structure including an antenna, transmitting means connected thereto, gas cylinder means, and means for operating the gas cylinder means and the transmitter which fulfills all of the objects and advantages sought therefor. Many changes, alterations, modifications and other uses of the subject device will, however, become apparent to those skilled in the art after considering this specification and the accompanying drawings which describe and show a particular preferred embodiment thereof. All such changes, alterations, modifications and other uses of the device which do not depart from the spirit and scope of the invention are deemed to be covered by the invention which is limited only by the claims which follow.

What is claimed is:

1. An emergency warning device comprising a collapsible balloon-like member, a unit including a gas pressure container including means energizable to release the pressure therein into the balloon to inflate the balloon and a signal transmitter, said unit being positioned on the interior surface of the balloon, a flexible conductive member forming an antenna having one end connected to the transmitter and an opposite end connected to the balloon on the opposite side thereof from the transmitter, said antenna having a length approximately equal to the diameter of the balloon to extend across the inside of the balloon when the balloon is inflated by the gas pressure container and means responsive to exposure of a liquid in which the device is positioned for energizing said pressure release means to release the gas pressure in the gas pressure container into the balloon.

2. A beacon type signaling apparatus comprising a balloon constructed of water impervious material, a source of compressed gas positioned inside said balloon adjacent the surface thereof for inflating the balloon when released, said last named means including an outlet passage from said source communicating with the interior of the balloon and a squib positioned closing said outlet passage, energy producing means operable when exposed to salt water connected to said squib for rupturing said squib to release the compressed gas into the balloon, transmitter means including a power supply therefor mounted inside said balloon adjacent to the source of compressed gas, switch means mounted outside of the balloon and adjacent to said transmitter and to said compressed gas source, said switch means being actuated in response to exposure to salt water to close, and means connecting said switch means into the transmitter power supply circuit to energize the transmitter when the switch means are exposed to salt water.

3. The beacon type signaling apparatus defined in claim 2 wherein said balloon has an inlet tube capable of being stretched large enough to receive the transmitter and compressed gas source therethrough, and a cord attached to said inlet tube for sealably closing the inlet tube and for towing the apparatus over the water.

4. The beacon type signaling apparatus defined in claim 2 including an antenna member constructed of flexible conductor material one end of which is connected to the transmitter and the opposite end of which is connected to the balloon on the opposite side thereof from the transmitter, said antenna member having a length that is slightly shorter than the diameter of the balloon so that when the balloon is inflated the antenna member will be in a relatively taut condition.

5. The beacon type signaling apparatus defined in claim 2 wherein said compressed gas source includes a cylinder containing compressed carbon dioxide mounted in the balloon adjacent to the transmittter, said cylinder having an outlet passage at one end that is closed by the squib.

6. The beacon type signaling apparatus defined in claim 2 wherein said transmitter, said power supply, and said compressed gas source are mounted on a plate member which is positioned adjacent to the inner surface of the balloon, a second plate-like member mounted on the outer surface of the balloon adjacent to said inner mounting plate, said switch means being mounted on the second plate for exposure to salt water in which the apparatus is located and means for connecting said inner and outer plates together with the balloon compressed therebetween in a water tight construction.

7. The beacon type signaling apparatus defined in claim 2 wherein said compressed gas source includes a pair of cylinders containing carbon dioxide under pressure, each of said cylinders having an outlet passage communicating with the inside of the balloon, and squib means closing each of said outlet passages, said squibs including members constructed of material capable of being ruptured when excited by an electric signal.

8. A beacon type signaling apparatus comprising an inflatable member, a transmitter having a source of energy connected thereto positioned inside the inflatable member, a compressed gas source including means for releasing the gas into the inflatable member to inflate said inflatable member, a flexible antenna member having one end connected to the transmitter and another end connected to the inflatable member on the opposite side thereof from the transmitter, a salt water switch including a pair of spaced conductor members separated from each other by an insulator and mounted on the outside of the balloon, means connecting one of said spaced members to the transmitter and the other of said spaced members to one side of the energy source, said spaced members being electrically connected when immersed in salt water, other means including a salt water battery mounted on the outside of the balloon, said salt water battery having electrical connections to the release means on the compressed gas source, said battery being capable of producing sufficient energy to actuate said release means to discharge the compressed gas from said source into the inflatable member to inflate said member when the battery is immersed in salt water.

9. An emergency warning device comprising an inflatable balloon having an inlet tube, an assembly including a gas pressure container capable of inflating the balloon and a radio transmitter positioned inside the balloon and attached to the surface thereof, said gas pressure container including means for releasing the compressed gas therein into the balloon, an antenna constructed of flexible conductive material having one end connected to the transmitter and another end connected to the balloon on the opposite side thereof from the transmitter so that the antenna extends across the inside of the balloon when the balloon is inflated, switch means mounted on the outer surface of the balloon and connected in a circuit for energizing the transmitter, said switch means being normally opened but closing when immersed in salt water, battery means mounted externally of the balloon adjacent to said switch means, and means connecting said battery to the release means for the gas pressure container, said battery means being normally inactive but being capable of producing sufficient energy when immersed in salt water to actuate the release means associated with the compressed gas container to release gas into the balloon to inflate the balloon.

10. The emergency warning device defined in claim 9 wherein the balloon inlet tube is formed of material that can be stretched large enough to pass the assembly therethrough.

11. An air-sea rescue device for transmitting signals to aid in rescue operation at sea comprising a balloon having a transmitter, a battery for the transmitter, and a gas pressure container mounted therein on the surface of the balloon, an antenna constructed of flexible material having one end connected to the transmitter and an opposite end connected to the balloon on the opposite side thereof from the trasmitter, means for releasing gas from the gas pressure container inside the balloon to inflate the balloon, said last named means including an energy source capable of producing energy output when immersed in salt water, and switch means also responsive to salt water for energizing the transmitter, said switch means being connected in circuit with the transmitter and transmitter battery to energize the transmitter when immersed in salt water, said switch means and energy source being located on the outside of the balloon adjacent to the transmitter.

12. The air-sea rescue device defined in claim 11 wherein the antenna is shorter than the inflated balloon diameter.

13. The air-sea rescue device defined in claim 11 wherein said gas pressure container includes an opening therein, and a member closing said opening, said last named member being constructed of a material that is self-rupturing when excited electrically by the energy source.

(References on following page)

References Cited by the Examiner

UNITED STATES PATENTS

| | | | |
|---|---|---|---|
| 1,485,776 | 3/1924 | Harrison | 325—116 |
| 2,310,017 | 2/1943 | Canon et al. | 325—116 |
| 2,470,783 | 5/1949 | Mead. | |
| 2,497,852 | 2/1950 | Arenstein | 325—116 X |
| 2,907,875 | 10/1959 | Seyfang | 325—116 X |
| 3,024,358 | 3/1962 | Grady | 325—116 X |
| 3,095,568 | 6/1963 | Aine et al. | |

DAVID G. REDINBAUGH, *Primary Examiner.*

JOHN W. CALDWELL, *Examiner.*